United States Patent
Wang et al.

(10) Patent No.: US 9,054,376 B2
(45) Date of Patent: Jun. 9, 2015

(54) CATHODE MATERIAL STRUCTURE AND METHOD FOR PREPARING THE SAME

(75) Inventors: Tsung-Hsiung Wang, Taichung (TW); Jing-Pin Pan, Hsinchu County (TW); Chung-Liang Chang, Hsinchu (TW); Yu-Ling Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 576 days.

(21) Appl. No.: 13/046,781

(22) Filed: Mar. 14, 2011

(65) Prior Publication Data
US 2012/0153231 A1   Jun. 21, 2012

(30) Foreign Application Priority Data
Dec. 20, 2010   (TW) .............................. 99144821 A

(51) Int. Cl.
| | |
|---|---|
| H01M 4/88 | (2006.01) |
| H01M 4/36 | (2006.01) |
| H01M 4/131 | (2010.01) |
| H01M 4/1391 | (2010.01) |
| H01M 4/485 | (2010.01) |
| H01M 4/505 | (2010.01) |
| H01M 4/525 | (2010.01) |
| H01M 4/58 | (2010.01) |
| H01M 4/62 | (2006.01) |

(52) U.S. Cl.
CPC .............. *H01M 4/366* (2013.01); *H01M 4/131* (2013.01); *H01M 4/1391* (2013.01); *H01M 4/485* (2013.01); *H01M 4/505* (2013.01); *H01M 4/525* (2013.01); *H01M 4/5825* (2013.01); *H01M 4/622* (2013.01); *H01M 4/624* (2013.01); *Y02E 60/122* (2013.01)

(58) Field of Classification Search
CPC .... H01M 4/366; H01M 4/1391; H01M 4/131
USPC .......... 252/182.1, 500, 519.33; 429/246, 325, 429/231.95; 424/497
See application file for complete search history.

(56) References Cited

U.S. PATENT DOCUMENTS

| | | | |
|---|---|---|---|
| 6,228,531 B1 | 5/2001 | Kolb et al. | |
| 2003/0158310 A1 | 8/2003 | Asano et al. | |
| 2005/0208380 A1 | 9/2005 | Park et al. | |
| 2006/0246354 A1* | 11/2006 | Lee et al. | 429/246 |
| 2007/0020525 A1 | 1/2007 | Kim et al. | |

(Continued)

FOREIGN PATENT DOCUMENTS

| | | |
|---|---|---|
| CN | 1416189 A | 5/2003 |
| CN | 1797822 A | 7/2006 |

(Continued)

OTHER PUBLICATIONS

Wang et al., "Novel SEI formation of maleimide-based additives and its improvement of capability and cyclicability in lithium ion batteries," Electrochimica Acta, 2009, pp. 3344-3351.

(Continued)

*Primary Examiner* — Khanh Tuan Nguyen
(74) *Attorney, Agent, or Firm* — Jianq Chyun IP Office

(57) ABSTRACT

A cathode material structure and a method for preparing the same are described. The cathode material structure includes a material body and a composite film coated thereon. The material body has a particle size of 0.1-50 μm. The composite film has a porous structure and electrical conductivity.

18 Claims, 9 Drawing Sheets

(56) References Cited

U.S. PATENT DOCUMENTS

| | | | |
|---|---|---|---|
| 2007/0202410 A1 | 8/2007 | Takeuchi et al. | |
| 2008/0176141 A1* | 7/2008 | Pan et al. | 429/325 |
| 2009/0253043 A1 | 10/2009 | Bak | |
| 2010/0003401 A1 | 1/2010 | Horpel et al. | |
| 2010/0151326 A1 | 6/2010 | Jung et al. | |
| 2010/0159314 A1 | 6/2010 | Kim et al. | |
| 2010/0167129 A1* | 7/2010 | Wu et al. | 429/231.95 |
| 2010/0308281 A1* | 12/2010 | Zheng | 252/519.33 |

FOREIGN PATENT DOCUMENTS

| | | |
|---|---|---|
| JP | H11329504 | 11/1999 |
| JP | 2000048807 | 2/2000 |
| JP | 2008-226566 | 9/2008 |
| JP | 2009043514 | 2/2009 |
| JP | 2010108771 | 5/2010 |
| JP | 2010157512 | 7/2010 |
| TW | 200702405 | 1/2007 |
| TW | 200828658 | 7/2008 |
| TW | 201025697 | 7/2010 |

OTHER PUBLICATIONS

Wang et al., "Particle Compression and Conductivity in Li-Ion Anodes with Graphite Additives," Journal of The Electrochemical Society, Aug. 18, 2004, pp. A1489-A1498.

Chen et al., "Selection of Conductive Additives in Li-Ion Battery Cathodes a Numerical Study," Journal of The Electrochemical Society, Aug. 24, 2007, pp. A978-A986.

"Office Action of Japan Counterpart Application", issued on Apr. 23, 2013, p. 1-p. 4.

"Office Action of Taiwan Counterpart Application", issued on Jun. 24, 2013, p. 1-p. 8.

"First Office Action of China Counterpart Application", issued on Aug. 30, 2013, p. 1-p. 7.

* cited by examiner

US 9,054,376 B2

CATHODE MATERIAL STRUCTURE AND METHOD FOR PREPARING THE SAME

CROSS-REFERENCE TO RELATED APPLICATION

This application claims the priority benefit of Taiwan application serial no. 99144821, filed Dec. 20, 2010. The entirety of the above-mentioned patent application is hereby incorporated by reference herein and made a part of this specification.

BACKGROUND

1. Technical Field

This disclosure relates to a cathode material structure for a lithium-ion battery, and a method for preparing the cathode material structure.

2. Related Art

Current portable electronic products, such as digital cameras, cellular phones and notebook computers, require lightweight batteries. Among various types of batteries, the rechargeable lithium-ion battery has a unit-weight capacity three times higher that of the traditional lead storage battery, nickel-metal-hydride battery, Ni—Zn battery or Ni—Cd battery etc. and can be rapidly charged, and therefore has been used widely.

FIG. 1 schematically depicts a conventional lithium-ion battery, which includes a cathode 100, an anode 110, and an electrolyte 120 and a separator 130 between the two. The cathode 100 includes a cathode metal 102, and a cathode material 104 fixed/coated on the cathode metal 102 via a binder mixed with a conductive material. The anode 110 includes an anode metal 112 and an anode material 114 thereon.

The cathode material of a lithium-ion battery is usually an oxide of lithium and other metal(s), which has the following issues. When an internal short circuit occurs to release much heat, the cathode material tends to be damaged in the crystal structure to decompose, and may even release oxygen gas that reacts with the organic electrolyte to cause fire or even explosion. A current solution is to use a cathode material with high thermal/chemical stability, such as $LiMn_2O_4$, $LiFePO_4$, $LiNi_{1/3}CO_{1/3}Mn_{1/3}O_2$ (LNCM), $Li_4Ti_5O_{12}$ (LTO) or a combination thereof, which is not easily damaged in the crystal structure and does not easily generate oxygen gas, and is therefore safer. However, the capacity, power density or working voltage of the battery is often reduced by doing so.

Moreover, the continuous growth of the solid electrolyte interface (SEI) film will irreversibly raise the internal resistance of the battery, so that the capacity, power density, cycle lifetime, working voltage and charge/discharge efficiency are lowered rapidly.

Moreover, the overcharge resistance and over-discharge resistance of the cathode material also have to be raised. That is, in an overcharge or over-discharge operation, the cathode material on the cathode is required to exhibit no remarkable expansion, extension or shrinkage and also to prevent partial decomposition and deposition of the lithium component on the anode.

In addition, the internal resistance of current cathode material is high, so that the specific energy is lowered rapidly at high power output. The mechanical performances and tenacity of the cathode material structure also have to be enhanced to prevent crack or damage due to external compression, especially to prevent falling-off of the active material that would make a direct electrical connection to cause an internal short circuit. The chemical stability of the cathode material is also important, for the cathode material cannot be dissolved in the electrolyte and must have stable redox reactions.

Furthermore, when the lithium-ion battery is used at high temperature and low temperature repeatedly, the irreversibility of the cathode material is gradually increased so that the battery performance is gradually lowered with time. Although raising the charging termination voltage can increase the discharge capacity (specific energy) of the lithium-ion battery, the lifetime of the battery is shortened by doing so.

SUMMARY

Accordingly, this disclosure provides a cathode material structure, and a method for preparing the same.

The cathode material structure of this disclosure includes a material body, and a composite film coated on the material body. The material body has a particle size of 0.1-50 μm. The composite film has a porous structure and electrical conductivity.

The method for preparing a cathode material of this disclosure is described as follows. A material body with a particle size of 0.1-50 μm is provided. A composite film, which has a porous structure and electrical conductivity, is coated on the surface of the material body.

By coating a porous composite film having electrical conductivity on the surface of the cathode material, quite a few issues in the prior art can be solved, and sufficient electron conductivity can be provided to prevent increase in the resistance of the battery and the energy consumption.

In order to make the aforementioned and other objects, features and advantages of this disclosure comprehensible, a preferred embodiment accompanied with figures is described in detail below.

DESCRIPTION OF EMBODIMENTS

This disclosure is further explained with the following embodiments, which are not intended to limit the scope of this disclosure.

Figure 2:
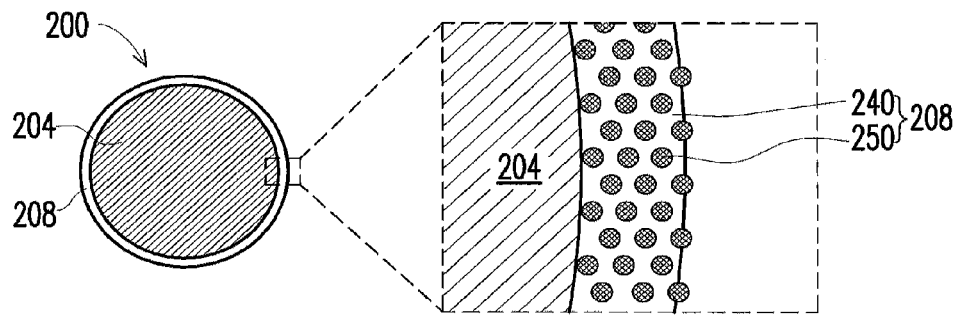
FIG. 2 schematically illustrates a cathode material structure according to an embodiment of this disclosure.

FIG. 2 schematically illustrates a cathode material structure according to an embodiment of this disclosure.

Referring to FIG. 2, the cathode material structure 200 includes a material body 204 having a particle size of 0.1-50 μm, and a composite film 208 coated thereon. The composite film 208 has a porous structure and electrical conductivity.

The material of the material body 204 is selected from the oxides of lithium and one or two other metals, i.e., Li-M-O series materials and Li—N—X—O series materials, wherein M is selected from the group consisting of Ni, Co, Mn, Mg, Ti, Al, Sn, Cr, V and Mo, N is selected from the group consisting of Fe, Ni, Co, Mn, V and Mo, and X is selected from the group consisting of P and Si.

As shown in FIG. 2, the composite film 208 may include a hyper-branched oligomer/polymer 240 and a nanometer conductive material 250 mixed therein. The thickness of the composite film 208 may range from 1 nm to 10 μm. It is particularly noted that in both the specification and claims of this disclosure, the scope of the term "hyper-branched oligomer/polymer" covers "at least one hyper-branched oligomer", "at least one hyper-branched polymer", and "a mixture of at least one hyper-branched oligomer and at least one hyper-branched polymer".

The hyper-branched oligomer/polymer 240 may include nitrogen atoms in the skeleton thereof. Such hyper-branched oligomer/polymer can be obtained in a process including polymerizing a diketone compound and at least one compound selected from the group consisting of amine compounds, amide compounds, imide compounds and maleimide compounds. The scope of such hyper-branched oligomer/polymer covers the so-called self-terminated oligomer with hyper-branched architecture. In addition, the hyper-branched oligomer/polymer 240 may also functions as a binder of the cathode material.

The general formula of the amine compounds is:

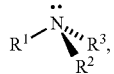

wherein $R^1$, $R^2$ and $R^3$ each independently represent hydrogen, an aliphatic group or an aromatic group but are not simultaneously hydrogen. The preferred amine compounds are primary amines where only two of $R^1$, $R^2$ and $R^3$ are hydrogen.

The general formula of the amide compounds is:

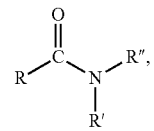

wherein R, R' and R" each independently represent hydrogen, an aliphatic group or an aromatic group but are not simultaneously hydrogen. The preferred amide compounds are primary amides where only R' and R" are both hydrogen.

The general formula of the imide compounds is:

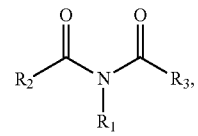

wherein R, R' and R" each independently represent hydrogen, an aliphatic group or an aromatic group but are not simultaneously hydrogen.

The maleimide compounds include mono-maleimide compounds, di-maleimide compounds and tri-maleimide compounds below, and poly-maleimide compounds. R, R' and R" each independently represent an aliphatic group or an aromatic group

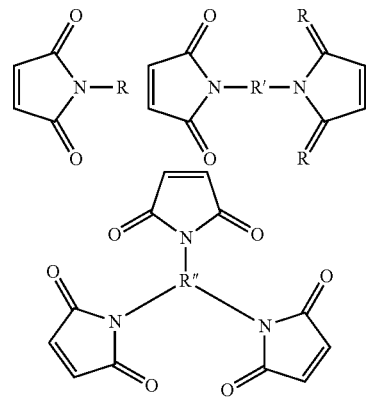

The diketone compounds include barbituric acid and the derivatives thereof, and acetylacetone (acac) and the derivatives thereof. The chemical structures of barbituric acid and some derivatives thereof are shown below:

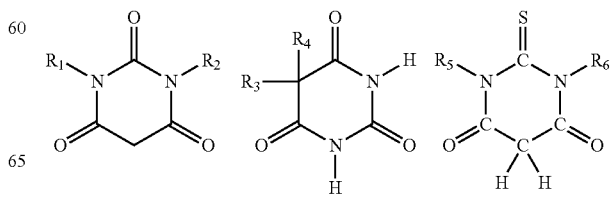

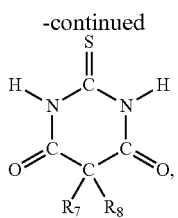

wherein $R^1$, $R^2$, $R^3$, $R^4$, $R^5$, $R^6$, $R^7$ and $R^8$ are the same substituent group or different substituent groups, each independently selected from the group consisting of hydrogen, methyl, ethyl, phenyl, isopropyl, —$CH_2CH(CH_3)_2$, —$CH_2CH_2CH(CH_3)_2$ and

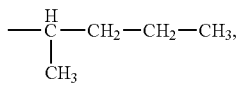

and the compound with $R^1$ and $R^2$ (or $R^3$ and $R^4$) both being hydrogen is barbituric acid.

The general formula of acac and the derivatives thereof is:

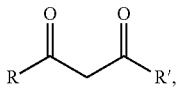

wherein R and R' each independently represent an aliphatic group or an aromatic group, and the compound with R and R' both being methyl is acetylacetone (acac).

The nanometer conductive material 250 can be selected from the group consisting of carbonaceous materials, inorganic conductive materials, organic conductive materials, and combinations thereof. Examples of the carbonaceous materials include carbon black, graphite, acetylene black, and combinations thereof. Examples of the inorganic conductive materials include nickel powder, aluminum powder, titanium powder, stainless steel powder, and combinations thereof. Examples of the organic conductive materials include organic conductive polymers. In addition, the particle size of the nanometer conductive material 250 can be 1-500 nm, suitably 10-200 nm.

Figure 1:
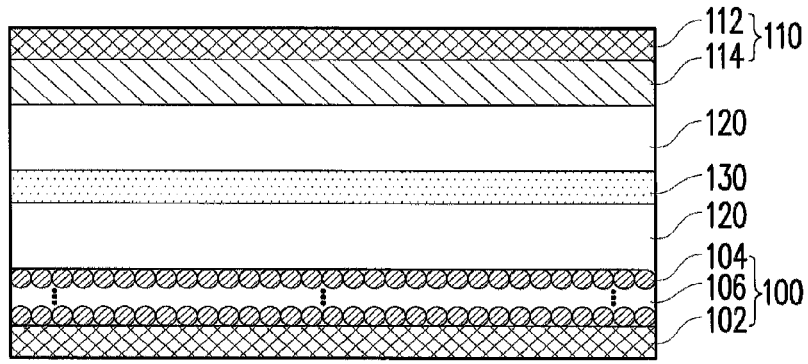
FIG. 1 schematically depicts a conventional lithium-ion battery.

In an embodiment of this disclosure, the hyper-branched oligomer/polymer 240 is a self-terminated oligomer with hyper-branched architecture, having a thickness of 40-50 nm and an amount of 0.3-0.8 wt % relative to the entire cathode. The nanometer conductive material 250 is the conductive carbon black Super P® with a particle size of 30-80 nm, wherein the total amount of Super P® in the hyper-branched oligomer/polymer 240 and in the binder (106, FIG. 1) is 0.01-10 wt %, or 0.1-10 wt % or 0.5-2 wt %, relative to the entire cathode.

The cathode material structure 200 may be formed with the following process. The nanometer conductive material 250 is added into a solution of the monomers of the hyper-branched oligomer/polymer 240, and the solution is heated to induce chelating of the monomers to the nanometer conductive material 250 first. The material body 204 of the cathode material is then added, and an in-situ coating reaction is induced on the surface of the material body 204 at a lower temperature to form thereon a uniformly coated composite film 208, during which the molecules of the hyper-branched oligomer/polymer 240 with the nanometer conductive material 250 mixed therein are elongated.

In another embodiment, coating the composite film 208 on the material body 204 may include the following process. The material body 204 is immersed in a solution containing the hyper-branched oligomer/polymer 240 and the nanometer conductive material 250. The solution is then stirred at a temperature between room temperature and 150° C. to perform in-situ coating of the hyper-branched oligomer/polymer 240 on the surface of the material body 204, together with the nanometer conductive material 250 mixed in the hyper-branched oligomer/polymer 240. Experiment examples for the preparation of a solution containing the hyper-branched oligomer/polymer 240 and the nanometer conductive material 250 are provided later.

In one embodiment, coating the composite film 208 on the material body 204 may include the following process. The material body 204 is immersed in a solution containing the nanometer conductive material 250 and a precursor of the hyper-branched oligomer/polymer 240. The solution is then stirred at a temperature between room temperature and 150° C. to perform in-situ synthesis of the oligomer/polymer 240 and in-situ coating of the same on the surface of the material body 204, together with the nanometer conductive material 250 mixed in the hyper-branched oligomer/polymer 240. Experiment examples for the preparation of a solution containing the nanometer conductive material 250 and a precursor of the hyper-branched oligomer/polymer 240 and the nanometer conductive material 250 are described later.

The lithium-ion battery according to an embodiment of this invention uses the above cathode material structure 200. The entire structure of the lithium ion battery is similar to that shown in FIG. 1, except that the conventional cathode material 104 is replaced by the cathode material structure 200 of this invention. In addition, the binder 106 may include polyvinylidene fluoride (PVDF), polytetrafluoroethylene (PTFE), sodium carboxymethylcellulose (NaCMC), or styrene-butadiene rubber (SBR) emulsion.

Examples

Synthesis Examples of Hyper-Branched Polymer

<Synthesis of Hyper-Branched Polymer-a>

In a four-neck reactor of 250 ml, 0.45 g (0.0036 M) of barbituric acid and 2.55 g (0.0071 M) of N,N'-4,4'-diphenylmethane-dimaleimide were added, and then 97.0 g of N-methylpyrrolidone (NMP) was added and stirred to dissolve the two compounds. A polymerization reaction was conducted at 130° C. in an $N_2$-atmosphere for 48 hours to obtain a nitrogen-containing polymer in a solid content of 3.0%, which had a thermal actuation temperature range of 90-260° C. including an optimal range of 140-200° C., as measured by a DSC analysis (10° C./min, in $N_2$-gas).

<Synthesis of Hyper-Branched Polymer-b>

In a four-neck reactor of 250 ml, 3.033 g (0.0237 M) of barbituric acid and 16.97 g (0.0474 M) of N,N'-4,4'-diphenylmethane-dimaleimide were added, and then 80.0 g of γ-butyrolactone (GBL) was added and stirred to dissolve the two compounds. A polymerization reaction was conducted at 130° C. in an $N_2$-atmosphere for 6 hours to obtain a nitrogen-containing polymer in a solid content of 20%, which had a thermal actuation temperature range of 100-240° C. including an optimal range of 120-180° C., as measured by the DSC analysis (10° C./min, in $N_2$-gas).

<Synthesis of Hyper-Branched Polymer-c>

In a four-neck reactor of 250 ml, 1.14 g (0.0089 M) of barbituric acid and 6.36 g (0.0178 M) of N,N'-4,4'-diphenylmethane-dimaleimide were added, and then 92.5 g of a co-solvent containing NMP and N,N'-dimethylacetamide (DMAC) in a weight ratio of 1:1 was added and stirred to dissolve the two compounds. A polymerization reaction was conducted at 130° C. in an N$_2$-atmosphere for 12 hours to get a nitrogen-containing polymer in a solid content of 7.5%, which had a thermal actuation temperature range of 90-260° C. including an optimal range of 140-200° C., as measured by the DSC analysis (10° C./min, in N$_2$-gas).

<Synthesis of Hyper-Branched Polymer-d>

In a four-neck reactor of 250 ml, 0.45 g (0.0039 M) of acetylacetone and 2.55 g (0.0071 M) of N,N'-4,4'-diphenylmethane-dimaleimide were added, and then 97.0 g of dimethylformamide (DMF) was added and stirred to dissolve the two compounds. A polymerization reaction was conducted at 130° C. in an N$_2$-atmosphere for 48 hours to get a nitrogen-containing polymer in a solid content of 3.0%, which had a thermal actuation temperature range of 150-250° C. including an optimal range of 170-210° C., as measured by the DSC analysis (10° C./min, in N$_2$-gas).

<Synthesis of Hyper-Branched Polymer-e>

In a four-neck reactor of 250 ml, 0.45 g (0.0029 M) of 1,3-dimethylbarbituric acid and 2.55 g (0.0071 M) of polymaleimide were added, and then 97.0 g of a co-solvent containing propylene carbonate and diethyl carbonate (DEC) in a volumetric ratio of 4:6 was added and stirred to dissolve the two compounds. A polymerization reaction was conducted at 130° C. in an N$_2$-atmosphere for 48 hours to get a nitrogen-containing polymer in a solid content of 3.0%, which had a thermal actuation temperature range of 170-280° C. including an optimal range of 190-240° C., as measured by the DSC analysis (10° C./min, in N$_2$-gas).

<Synthesis of Hyper-Branched Polymer-f>

In a reactor with a mechanical stirring function, 1.77 g (0.014 M) of barbituric acid and 1.23 g (0.0026 M) of polymaleimide were added and stirred (500 rpm) in the solid state at 130° C. in an N$_2$-atmosphere to polymerize for 30 min, thereby producing a nitrogen-containing polymer. The polymer had a thermal actuation temperature range of 180-250° C. including an optimal range of 190-230° C., as measured by the DSC analysis (10° C./min, in N$_2$-gas).

<Synthesis of Hyper-Branched Polymer-g>

In a reactor with a mechanical stirring function, 0.20 g (0.0016 M) of barbituric acid and 2.8 g (0.0060 M) of polymaleimide were added and stirred (500 rpm) in the solid state at 130° C. in an N$_2$-atmosphere to polymerize for 30 min, thereby producing a nitrogen-containing polymer. The polymer had a thermal actuation temperature range of 130-240° C. including an optimal range of 160-220° C., as measured by the DSC analysis (10° C./min, in N$_2$-gas).

<Synthesis of Hyper-Branched Polymer-h>

In a four-neck reactor of 250 ml, 0.91 g (0.0071 M) of barbituric acid, 2.55 g (0.0071 M) of N,N'-4,4'-diphenylmethane-dimaleimide and 1.54 g (0.0071 M) of p-maleimidobenzoic acid were added, and then 95.0 g of N-methylpyrrolidone (NMP) was added and stirred to dissolve the three compounds. A polymerization reaction was conducted at 130° C. in an N$_2$-atmosphere for 24 hours to obtain a nitrogen-containing polymer in a solid content of 5.0%, which had a thermal actuation temperature range of 90-220° C. including an optimal range of 130-180° C., as measured by the DSC analysis (10° C./min, in N$_2$-gas).

[Preparation of Precursor Solution]

<Solution of Precursor-a>

In a reactor with a mechanical stirring function, 0.715 g (0.0056 M) of barbituric acid and 10 g (0.0279 M) of N,N'-4,4'-diphenylmethane-dimaleimide were added and stirred (500 rpm) in the solid state at 25° C. to react for 5 min and produce a fine powder as the precursor-a. The precursor-a was dissolved in 200 g of NMP to prepare a solution of the precursor-a with a solid content of 5%.

<Solution of Precursor-b>

In a reactor with a mechanical stirring function, 1.6 g (0.0125 M) of barbituric acid and 8.9 g (0.0249 M) of N,N'-4,4'-diphenylmethane-dimaleimide were added and stirred (500 rpm) in the solid state at 25° C. to react for 5 min and produce a fine powder as the precursor-b. The precursor-b was dissolved in 200 g of NMP to prepare a solution of the precursor-b with a solid content of 5%.

<Solution of Precursor-c>

In a reactor with a mechanical stirring function, 4.38 g (0.0342 M) of barbituric acid and 6.1 g (0.0171 M) of N,N'-4,4'-diphenylmethane-dimaleimide were added and stirred (500 rpm) in the solid state at 25° C. to react for 5 min and produce a fine powder as the precursor-c. The precursor-c was dissolved in 200 g of NMP to prepare a solution of the precursor-c with a solid content of 5%.

<Solution of Precursor-d>

A solution was prepared by dissolving 0.715 g (0.0056 M) of barbituric acid and 10 g (0.0279 M) of N,N'-4,4'-diphenylmethane-dimaleimide in 200 g of NMP, heated to 60° C. to react for 1 hour, and then cooled to room temperature. Thereby, a solution of the precursor-d with a solid content of 5% was prepared.

<Solution of Precursor-e>

A solution was prepared by dissolving 1.6 g (0.0125 M) of barbituric acid and 8.9 g (0.0249 M) of N,N'-4,4'-diphenylmethane-dimaleimide in 200 g of NMP, heated to 60° C. to react for 1 hour, and then cooled to room temperature. Thereby, a solution of the precursor-e with a solid content of 5% was prepared.

[Preparation of Solution of Combination of Reactive Monomers]

<Solution-a of Combination of Reactive Monomers>

A solution-a of a combination of reactive monomers with a solid content of 5% was prepared by dissolving 0.715 g (0.0056 M) of barbituric acid and 10 g (0.0279 M) of N,N'-4,4'-diphenylmethane-dimaleimide in 200 g of NMP.

<Solution-b of Combination of Reactive Monomers>

A solution-b of a combination of reactive monomers with a solid content of 5% was prepared by dissolving 1.6 g (0.0125 M) of barbituric acid and 8.9 g (0.0249 M) of N,N'-4,4'-diphenylmethane-dimaleimide in 200 g of NMP.

[Preparation of Modified Cathode Material Coated with Composite Film]

<Modified Cathode Material-a>

The solution-a of a combination of reactive monomers was added with 10 g of Super P® as a nanometer conductive material and heated to 70° C. to react for 6 hours. The resulting solution was added with 100 g of LiCoO$_2$ (LCO) as a cathode material and then heated to 130° C. to successively react for 30 min and produce a slurry of the modified cathode material-a coated with a composite film. About 5 g of the slurry was taken out, extracted by acetone and filtered by several times, and then the filtrate was sucked dry in a vacuum oven of 40° C. to obtain a fine powder as the modified cathode material-a coated with a composite film.

<Modified Cathode Material-b>

The solution-a of a combination of reactive monomers was added with 10 g of Super P® and heated to 70° C. to react for 6 hours. The resulting solution was added with 100 g of LiNiCoO$_2$ (LNCO) as a cathode material and then heated to 130° C. to successively react for 30 min and produce a slurry of the modified cathode material-b coated with a composite film. About 5 g of the slurry was taken out, extracted by acetone and filtered by several times, and then the filtrate was sucked dry in a vacuum oven of 40° C. to obtain a fine powder as the modified cathode material-b coated with a composite film.

<Modified Cathode Material-c>

The solution-a of a combination of reactive monomers was added with 10 g of Super P® and heated to 70° C. to react for 6 hours. The resulting solution was added with 100 g of LNCM as a cathode material and heated to 130° C. to successively react for 30 min and produce a slurry of the modified cathode material-c coated with a composite film. About 5 g of the slurry was taken out, extracted by acetone and filtered by several times, and then the filtrate was sucked dry in a vacuum oven of 40° C. to obtain a fine powder as the modified cathode material-c coated with a composite film.

<Modified Cathode Material-d>

The solution-a of a combination of reactive monomers was added with 10 g of Super P® and heated to 70° C. to react for 6 hours. The resulting solution was added with 100 g of $LiFePO_4$ as a cathode material and heated to 130° C. to successively react for 30 min and produce a slurry of the modified cathode material-d coated with a composite film. About 5 g of the slurry was taken out, extracted by acetone and filtered by several times, and then the filtrate was sucked dry in a vacuum oven of 40° C. to obtain a fine powder as the modified cathode material-d.

<Modified Cathode Material-e>

The solution-a of a combination of reactive monomers was added with 10 g of Super P® and heated to 70° C. to react for 6 hours. The resulting solution was added with 100 g of $LiMn_2O_4$ as a cathode material and heated to 130° C. to successively react for 30 min and produce a slurry of the modified cathode material-e coated with a composite film. About 5 g of the slurry was taken out, extracted by acetone and filtered by several times, and then the filtrate was sucked dry in a vacuum oven of 40° C. to obtain a fine powder as the modified cathode material-e.

[Preparation of Modified Cathode Plate]

<Modified Cathode Plate-a with Modified Cathode Material-a>

A slurry paste was prepared by dispersing 91 g of the powder of the modified cathode material-a, 6 g of KS6 as a conductive additive and 3 g of polyvinylidene fluoride (PVDF) binder in N-methylpyrrolidone (NMP), coated on an aluminum foil, and then dried at 130° C. The coated aluminum foil was then compressed and trimmed to form a modified cathode plate-a.

<Modified Cathode Plate-b with Modified Cathode Material-b>

A slurry paste was prepared by dispersing 91 g of the powder of the modified cathode material-b, 6 g of KS6 and 3 g of PVDF binder in NMP, coated on an aluminum foil, and then dried at 130° C. The coated aluminum foil was then compressed and trimmed to form a modified cathode plate-b.

<Modified Cathode Plate-c with Modified Cathode Material-c>

A slurry paste was prepared by dispersing 91 g of the powder of the modified cathode material-c, 6 g of KS6 and 3 g of PVDF binder in NMP, coated on an aluminum foil, and then dried at 130° C. The coated aluminum foil was then compressed and trimmed to form a modified cathode plate-c.

<Modified Cathode Plate-d with Modified Cathode Material-d>

A slurry paste was prepared by dispersing 91 g of the powder of the modified cathode material-d, 6 g of KS6 and 3 g of PVDF binder in NMP, coated on an aluminum foil, and then dried at 130° C. The coated aluminum foil was then compressed and trimmed to form a modified cathode plate-d.

<Modified Cathode Plate-e with Modified Cathode Material-e>

A slurry paste was prepared by dispersing 91 g of the powder of the modified cathode material-e, 6 g of KS6 and 3 g of PVDF binder in NMP, coated on an aluminum foil, and then dried at 130° C. The coated aluminum foil was then compressed and trimmed to form a modified cathode plate-e.

<Modified Cathode Plate-f with Mixed Modified Cathode Material>

A slurry paste was prepared by dispersing 91 g of a mixed powder of the modified cathode material-c and the modified cathode material-e in a weight ratio of 7:3, 6 g of KS6 and 3 g of PVDF binder in NMP, coated on an aluminum foil, and then dried at 130° C. The coated aluminum foil was then compressed and trimmed to form a modified cathode plate-f.

[Assembling of Lithium-Ion Cell]

Each modified cathode plate obtained as above was wound with a commercial graphite anode plate MCMB2528 (produced by Osaka Gas Co., Japan) for a standard lithium-ion battery and a PP/PE/PP tri-layer separation film to form a cell core. An aluminum cover was used in combination to form a 503759 (0.5 cm in thickness, 3.7 cm in width and 5.0 cm in length) cell, wherein three sides were sealed at a compression sealing condition of 4.0 kgf/cm$^2$ and 180° C./3 s and one side was not sealed. A standard electrolyte liquid for lithium-ion cell, which contained 1.1 M of $LiPF_6$ in a mixed solvent of EC, PC and DEC in a volumetric ratio of 3:2:5, was injected in the cell from the unsealed side, which was sealed at the same compression sealing condition after air suction. Each cell was injected with 4.2 g of the electrolyte liquid and activated by a standard formation process to form a lithium-ion cell of an example of this disclosure.

[Results of Tests]

<Variation of Free Volume with Temperature as Investigated by PAS>

The hyper-branched polymer-a obtained as above was subject to a PAS (Positron Annihilation Spectrum) analysis (radiation source: $^{22}$Na) under different temperatures to measure the variation of the free volume thereof with the temperature. A polyimide (PI) film as a Kapton® film (from DoPont) having a thickness of 25 μm, PVDF (from Atofina) and N,N'-4,4'-diphenylmethane-dimaleimide (BMI monomer, from Aldrich) were also subjected to similar measurements. The results are together shown in FIG. 3 for comparison.

Figure 3:
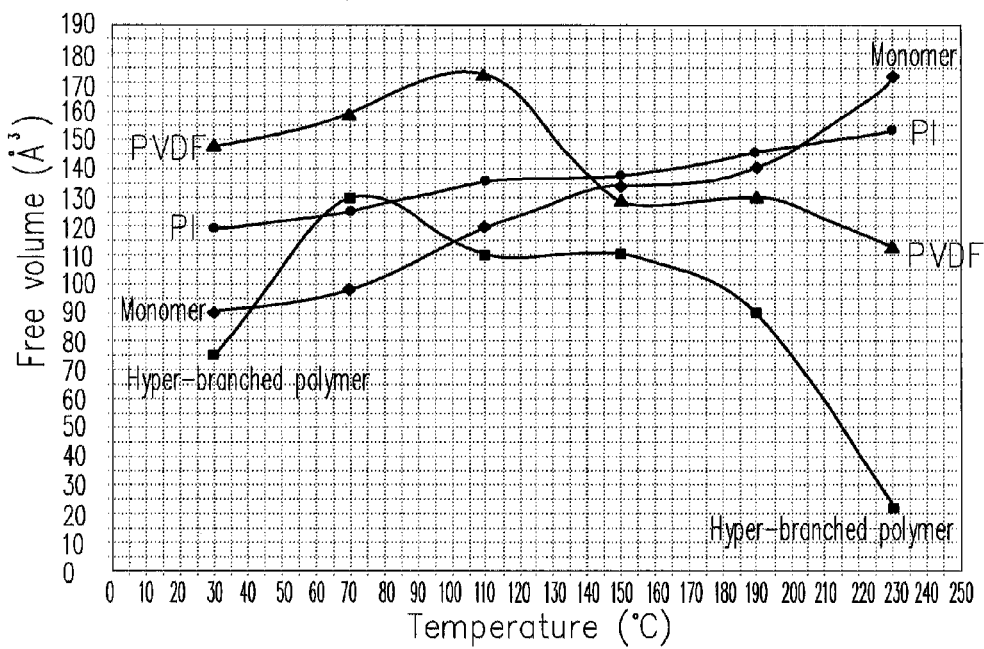
FIG. 3 shows the free volume-temperature curve of the hyper-branched polymer-a obtained in an example of this disclosure, which is plotted according to the result of a positron annihilation spectrum (PAS) analysis.

As shown in FIG. 3, from room temperature to 110° C., the free volume in the molecular structure of the hyper-branched polymer-a tended to increase, reaching a maximum at about 65° C. that was within the temperature range for battery operation. The free volume did not change much from 110° C. to 150° C., but rapidly decreased over 150° C. so that the conduction of lithium ion was effectively blocked. More specifically, the field-effect radius of a solvated lithium ion is several angstroms, while the free volumes of the hyper-branched polymer-a measured at room temperature, 70° C., 110° C., 150° C., 190° C. and 230° C. were 2.63 angstroms, 3.14 angstroms, 2.97 angstroms, 2.97 angstroms, 2.78 angstroms and 1.73 angstroms, respectively, so that the conduction of lithium ion could be effectively blocked when the temperature exceeded 150° C.

It is also clear from FIG. 3 that the free volume of the BMI monomer increases with raise of the temperature, but does not have the characteristic free-volume reduction of the hyper-branched polymer at high temperature. The free volume of the polyimide (PI) having a linear polymeric structure also increases with raise of the temperature, as generally expected.

The porous material PVDF, which acts as a binder of the cathode material and the conductive material of a lithium-ion cell, can work at 150° for a long period of time in general.

Moreover, as known from the variation of the free volume of PVDF with the temperature, PVDF satisfies the specifications of long-term operation under 150° C. after being annealed at 110-150° C., but cannot have the effect of blocking lithium ion even though its free volume decreases at 110-230° C. relative to the value at room temperature. As compared to the case of the hyper-branched polymer, the free volume variation of PVDF with temperature is much different. The hyper-branched polymer is superior to PVDF, especially in the thermal-actuation safety mechanism and response temperature.

[Detection of Formation of Hyper-Branched Polymer in Solution of Modified Cathode Material]

Upper layers of the solution for preparing the modified cathode material before and after the synthesis of the modified cathode material were taken out, filtered by a polytetrafluoroethylene (PTFE) filter of 0.45 μm, and subjected to a gel-permeation chromatography (GPC) analysis. According to the lowering and raise of the peaks in the GPC, after the synthesis reaction, most of the monomer molecules have polymerized to form a polymer with a hyper-branched structure for any one in the series of monomer combinations a-b and the series of precursors a-e of hyper-branched polymer, because there were no obvious peak of the monomer. The hyper-branched structure is similar to that coated on the surface of the cathode material.

[DB-FIB Inspection of Modified Cathode Material]

Figure 4:
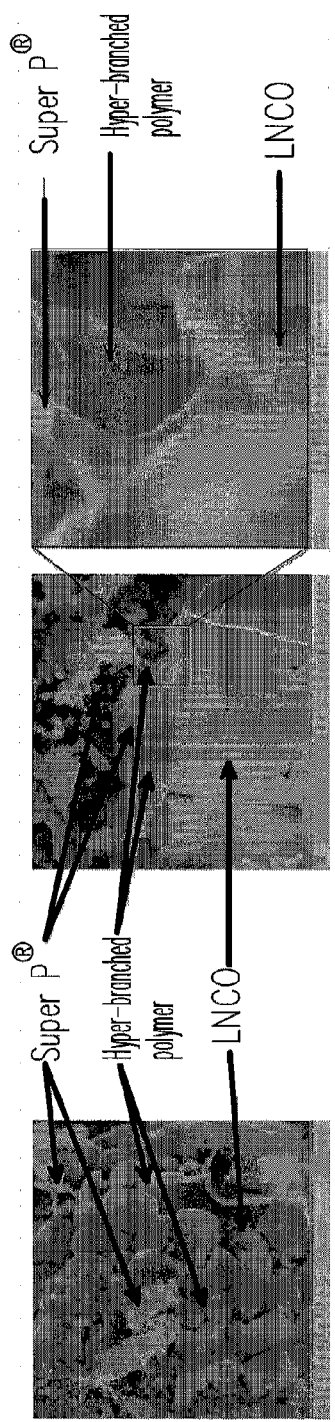
FIGS. 4 and 5 are the respective DB-FIB inspection images of the modified cathode material-b using $LiNiCoO_2$ (LNCO) and the modified cathode material-c using LNCM that were obtained in the experiment examples of this disclosure.
Figure 5:
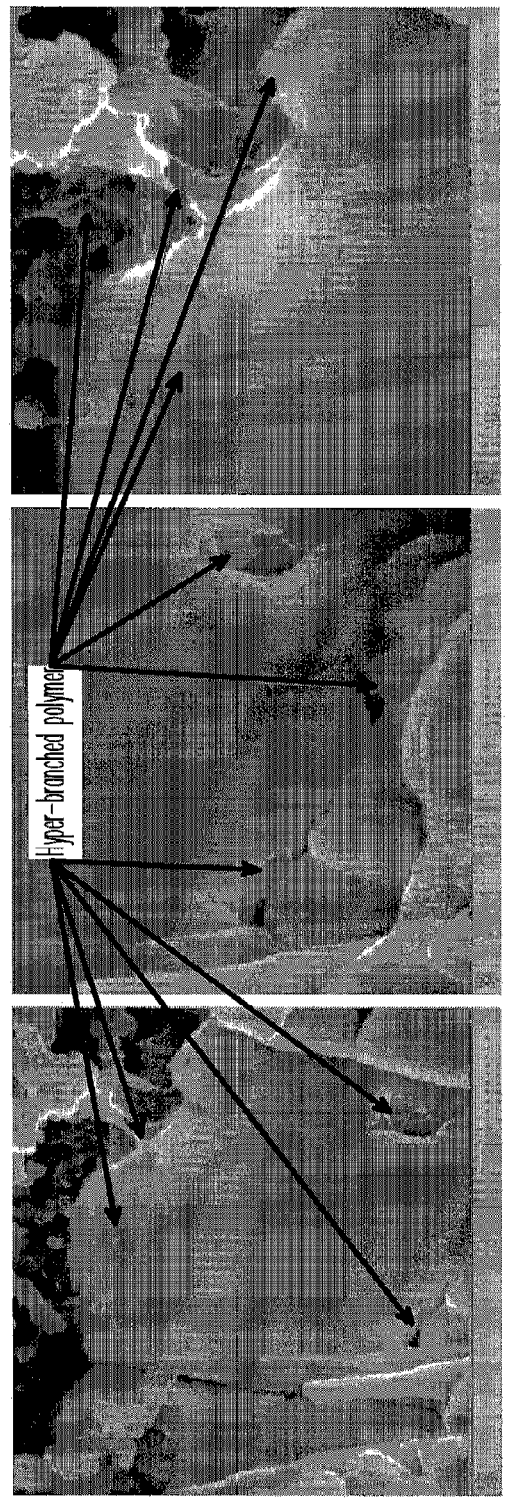

The double-beam focused ion beam (DB-FIB) inspection results of the modified cathode material-b based on LNCO and the modified cathode material-c based on LNCM are shown in FIGS. 4 and 5.

Referring to FIGS. 4 and 5, the surface of the cathode material LNCO or LNCM was coated with a hyper-branched polymer film in a coverage ratio near 100%, and the hyper-branched polymer has a porous structure according to the side-view image. In addition, Super P® particles were embedded in the hyper-branched polymer film coated on the LNCO or LNCM, wherein the hyper-branched polymer acted as a binder to bind Super P® to the surface of the cathode material LNCO or LNCM.

[Enhancement in Dispersion of Modified Cathode Material]

Figure 6:
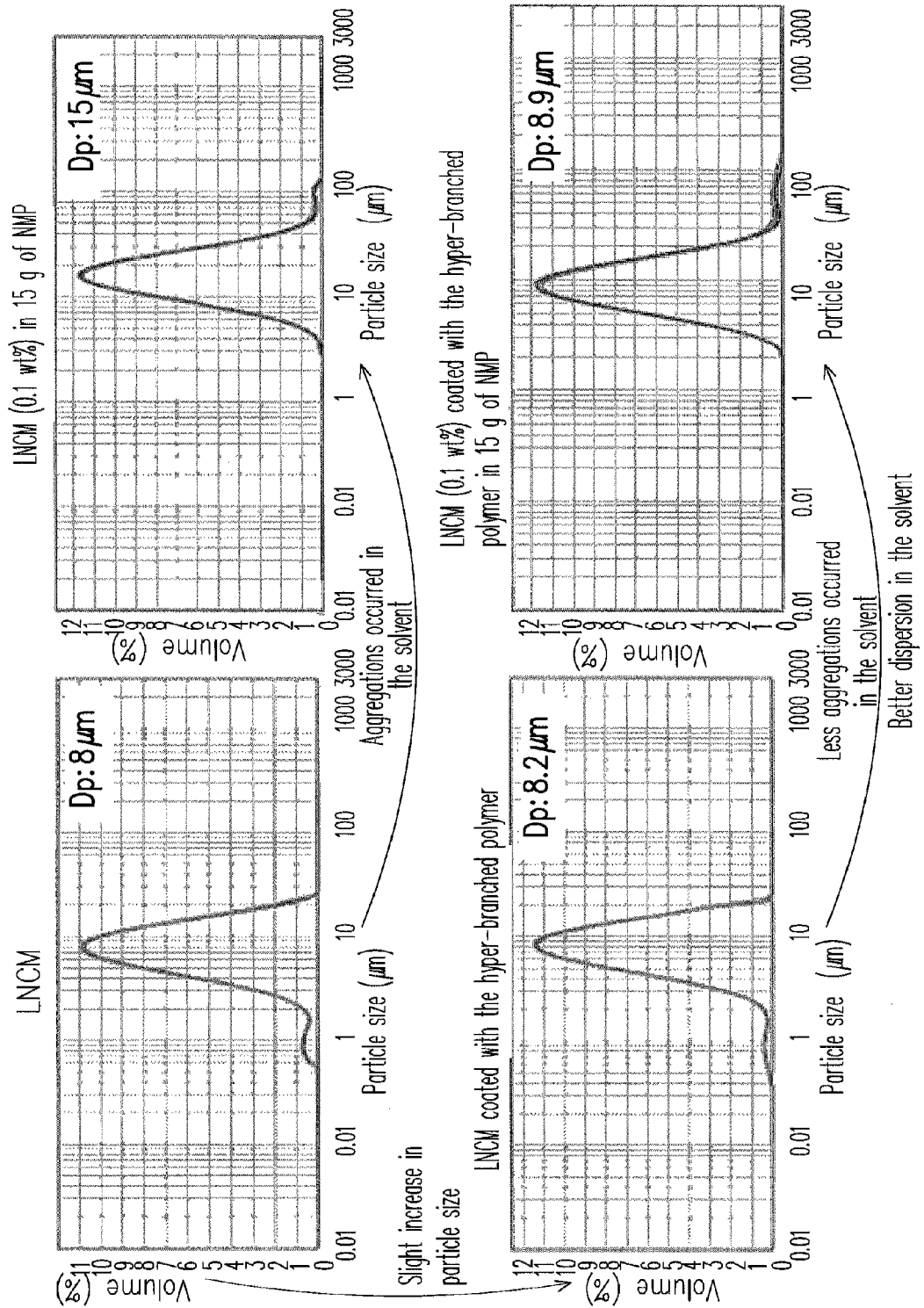
FIG. 6 shows the particle size distributions of a LNCM cathode material before and after the surface modification of this disclosure, which were measured using a laser particle-size analyzer.

FIG. 6 shows the particle size distributions of a cathode material LNCM before and after a surface modification of this disclosure, which were measured using a laser particle-size analyzer.

As shown in FIG. 6, the most populated particle size of the tri-metal cathode material LNCM was about 8 μm, and that of the modified cathode material-c based on LNCM and coated with a hyper-branched polymer is about 8.2 μm. The powders of the two LNCM materials before and after the modification were respectively used to prepare NMP solutions each containing 0.1 wt % of LNCM, which were also measured for the particle-size distribution. As a result, the most populated particle size of the non-modified LNCM in NMP was about 15 μm, indicating formation of aggregations of LNCM particles. The most populated particle size of the modified LNCM coated with the composite film in NMP was about 8.9 μm, which was slightly larger than that of the modified LNCM not in NMP but did not indicate formation of aggregations of LNCM particles. Accordingly, the modified LNCM also has a better dispersability.

[Improvement in Electron Conductivity of Modified Cathode Material]

A cathode material (A), a hyper-branched polymer (B), a nanometer conductive material (Super P®), a nanometer conductive material (C) coated with the hyper-branched polymer, the cathode material (D) coated with the hyper-branched polymer, and the cathode material (E) coated with a composite film including the hyper-branched polymer and the nanometer conductive material mixed in the hyper-branched polymer were respectively sampled by a certain volume and compressed into pallets each with a diameter of 1 cm and a thickness of 2 mm under a pressure of 8 ton/cm². Each pallet was measured for the resistance between two points of 0.5 cm apart on its surface with a mvolt-ohm-milliammeter, and the result is shown in Table 1.

TABLE 1

| Material (as pallet) | A | B | Super P® | C | D | E |
|---|---|---|---|---|---|---|
| Conductivity | x$^a$ | x | ✓$^b$ | ✓ | x | ✓ |

$^a$>20 MΩ;
$^b$<1 MΩ

As shown in Table 1, there was good electron conductivity between the particles of the modified cathode material coated on its surface with a composite film containing a hyper-branched polymer and a nanometer conductive material.

[Heat-resistance Improvement and Exothermic Output Reduction of Modified Cathode Material]

A cathode plate with non-modified LCO and the LCO cathode plate with the modified cathode material-a obtained as above were respectively used to make button-type half cells. After being fully charged at 4.3V, the half cells were disassembled in a glove box full of argon, and 7-10 mg of each cathode plate containing the electrolyte was scratched off and put in a thermoanalysis sample disk sustaining 150 bar to conduct a differential scanning calorimetry (DSC) test. The LCO cathode plates were also subjected to a thermogravimetric analysis (TGA) after being washed and dried. As indicated by the result of the DSC test, for the modified cathode material, not only the exothermic on-set temperature is higher, but also the exothermic output was less.

In addition, other modified cathode materials were prepared based on LiNiCoO$_2$ (LNCO), LiMn$_2$O$_4$ (LMO), Li Ni$_{1/3}$Co$_{1/3}$Mn$_{1/3}$O$_2$, (LNCM) or [LiNi$_{1/3}$Co$_{1/3}$Mn$_{1/3}$O$_2$+LiMn$_2$O$_4$] (LNCM+LMO) instead of LCO. Non-modified and modified cathode plates were made based on these non-modified and modified cathode materials and then used to make button-type half cells, as in the case of LCO. After being fully charged at 4.3V, the half cells were disassembled in a glove box full of argon, and 7-10 mg of each cathode plate containing the electrolyte was scratched off and put in a thermoanalysis sample disk sustaining 150 bar to conduct a DSC test. The result is shown in Table 2.

TABLE 2

| | | Cathode material used by cathode plate | | | | |
|---|---|---|---|---|---|---|
| DSC sample | Item | LCO | LNCO | LMO | LNCM | [LNCM + LMO] |
| Non-modified cathode material | Exothermic output (ΔH$_1$, J/g) | 935 | 180 | 743 | 870 | 788 |
| | On-set peak temperature (° C.) | 221 | 152 | 225 | 221 | 283 |

TABLE 2-continued

| DSC sample | Item | Cathode material used by cathode plate | | | | |
| --- | --- | --- | --- | --- | --- | --- |
| | | LCO | LNCO | LMO | LNCM | [LNCM + LMO] |
| Modified cathode material | Weight percentage of the modifier (wt %) | 2.5 | 1.0 | 2.0 | 2.0 | 0.3 |
| | Exothermic output ($\Delta H_2$, J/g) | 503 | 158 | 359 | 700 | 522 |
| | On-set peak temperature (° C.) | 223 | 187 | 208 | 218 | 289 |
| Reduction in exothermic output | ($\Delta H_1 - \Delta H_2$)/$\Delta H_1$ × 100% | 46.2% | 12.2% | 51.7% | 19.5% | 33.8% |

Electrolyte system: 1.0M of $LiPF_6$, in EC/PC/DEC in a volumetric ratio of 3:2:5
DSC test conditions: 1) gas switched to $N_2$ (20 ml/min); 2) heated from 30° C. to 850° C. (10° C./min)

As shown in Table 2, the modified cathode material had a less exothermic output that is reduced by at least over 10% as compared to that of the non-modified one.

[XPS Surface Analysis]

The above cathode plate with the non-modified cathode material and that with the modified cathode material were respectively used to make button-type half cells. After being fully charged at 4.3V, the half cells were disassembled in a glove box full of argon. The two kinds of cathode plates were subjected to an X-ray photoelectron spectroscopy (XPS) surface analysis after being washed by DMC and dried.

Figure 7A:
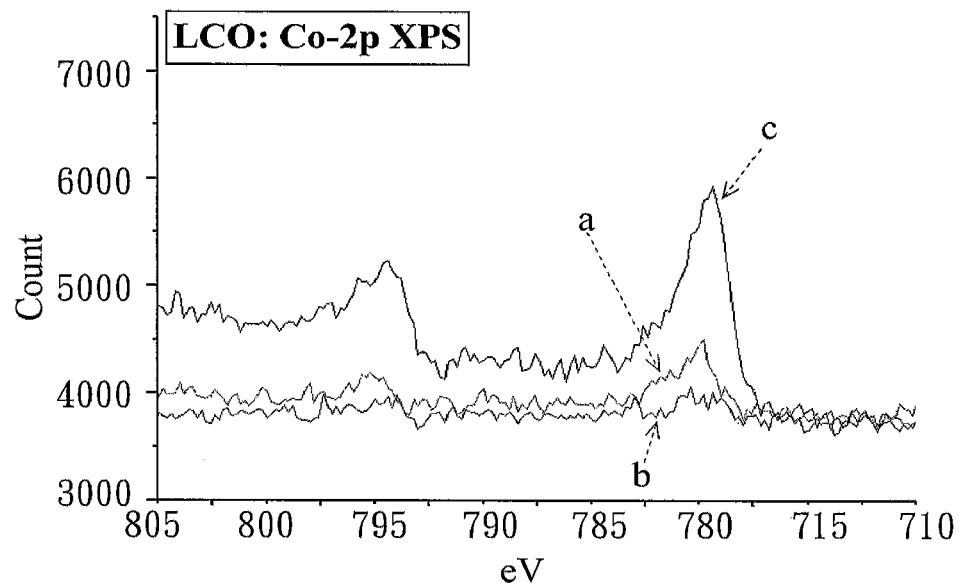
FIGS. 7A and 7B are the Co-2p X-ray photoelectron spectra (XPS) and the N-1s XPS respectively of a) the surface of the fresh electrode having 2% of the hyper-branched polymer obtained in an experiment example of this disclosure, b) the surface of the electrode having 2% of the hyper-branched polymer after the cell was formed, and c) the surface of the electrode without the hyper-branched polymer after the cell was formed.
Figure 7B:
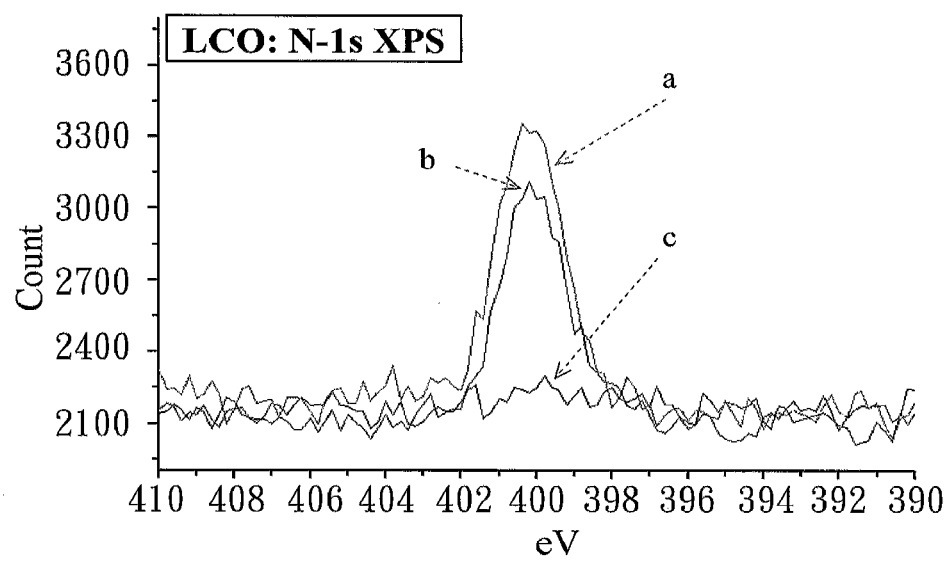
Figure 7C:
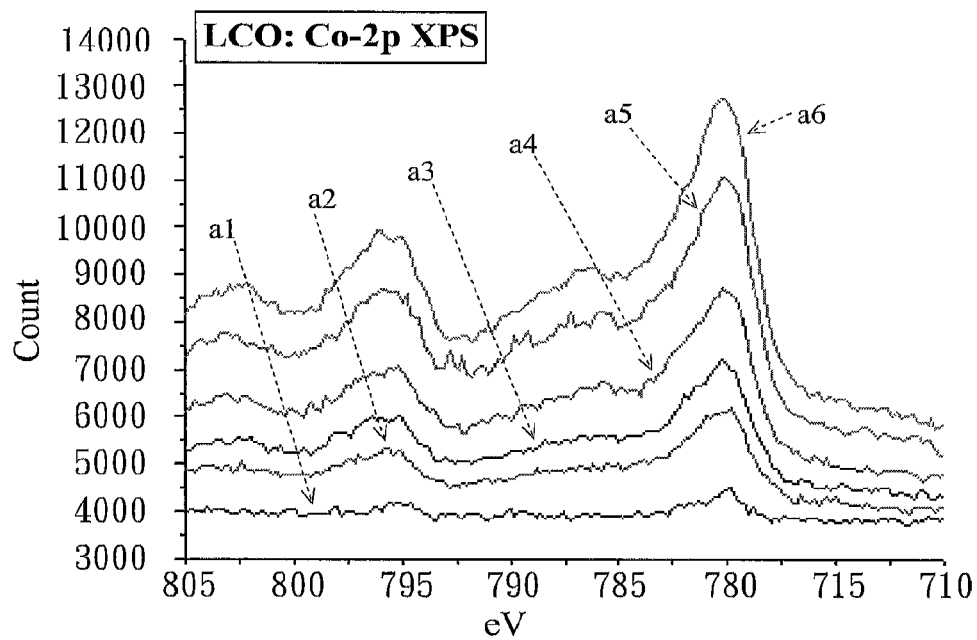
FIG. 7C is the Co-2p XPS of the electrode surface of the above case a after a1) 0 min, a2) 5 min, a3) 10 min, a4) 20 min, a5) 40 min and a6) 60 min, respectively.
Figure 7D:
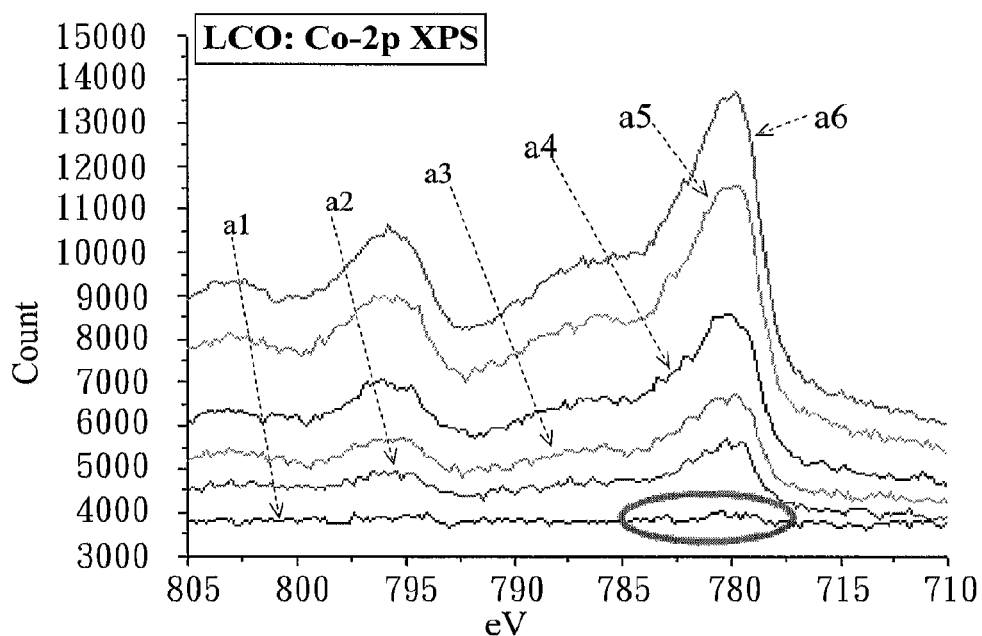
FIG. 7D is the Co-2p XPS of the electrode surface of the above cases b after b 1) 0 min, b2) 5 min, b3) 10 min, b4) 20 min, b5) 40 min and b6) 60 min, respectively.

Taking the $LiCoO_2$ (LCO) cathode material as an example, FIGS. 7A and 7B shows the Co-2p X-ray photoelectron spectra (XPS) and the N-1s XPS respectively of a) the surface of the fresh electrode having 2% of the hyper-branched polymer obtained in the examples of this disclosure, b) the surface of the electrode having 2% of the hyper-branched polymer after the cell was formed, and c) the surface of the electrode without the hyper-branched polymer after the cell was formed. FIG. 7C shows the Co-2p XPS of the electrode surface of the above case a after a1) 0 min, a2) 5 min, a3) 10 min, a4) 20 min, a5) 40 min and a6) 60 min, respectively. FIG. 7D shows the Co-2p XPS of the electrode surface of the above cases b after b1) 0 min, b2) 5 min, b3) 10 min, b4) 20 min, b5) 40 min and b6) 60 min, respectively.

As shown in FIGS. 7A-7D, in the fresh state, the cathode plate with the modified LCO almost showed no Co signal (FIG. 7D), but the cathode plate with non-modified LCO showed an obvious Co signal (FIG. 7A). This indicated that the modified LCO was covered by an organic passivation film containing nitrogen. The Co signal of the modified LCO cathode plate became obvious after being sputtered by Ar-ion for 5 min, and further increased with the increase in the sputtering time. As known from the result of the Co-2p and N-1s XPS surface analyses, the modified LCO cathode plate contained a nitrogen-containing organic passivation film, whose signal was still intense even after being sputtered by Ar-ion for 20 min. The nitrogen-containing organic passivation film should be the hyper-branched polymer film coated on the LCO, having a thickness of about 80-150 nm.

Comparative Example

The lithium-ion cell using the cathode material of the comparative example was fabricated in a similar manner as that using the modified cathode material of an example of this disclosure, and was different from the latter only in that the cathode material was not modified. That is, the anode material, the electrolyte, the assembling process and the component ratio of the former were the same as those of the latter.

<AC Impedance of Lithium-Ion Cell and Cycle Lifetime Test>

Figure 8A:
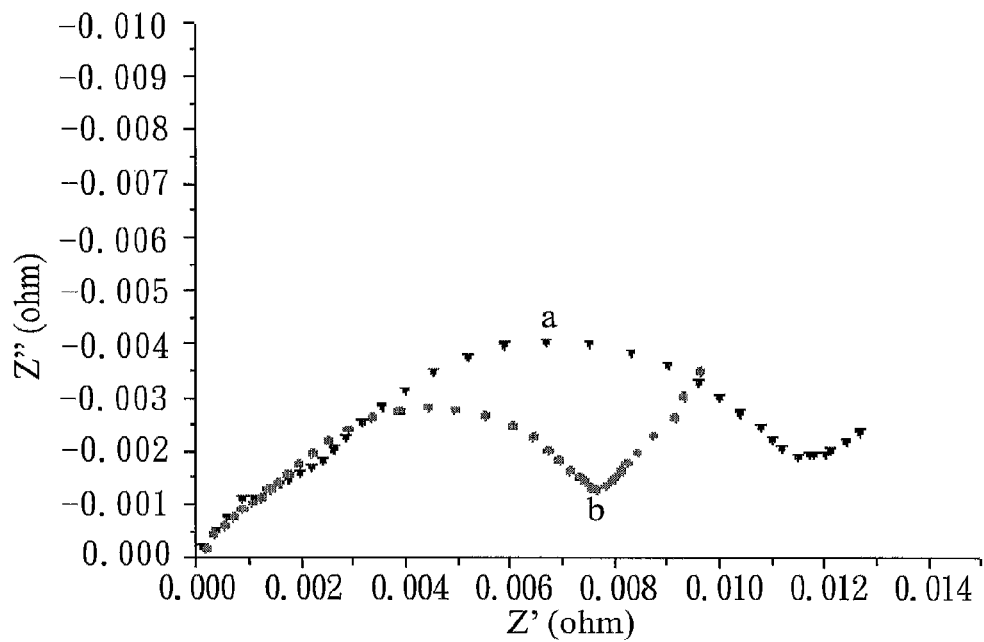
FIG. 8A shows the alternating current (AC) impedance in the charging activation test of a half cell including the cathode plate of an example of this disclosure and a half cell including that of the comparative example.
Figure 8B:
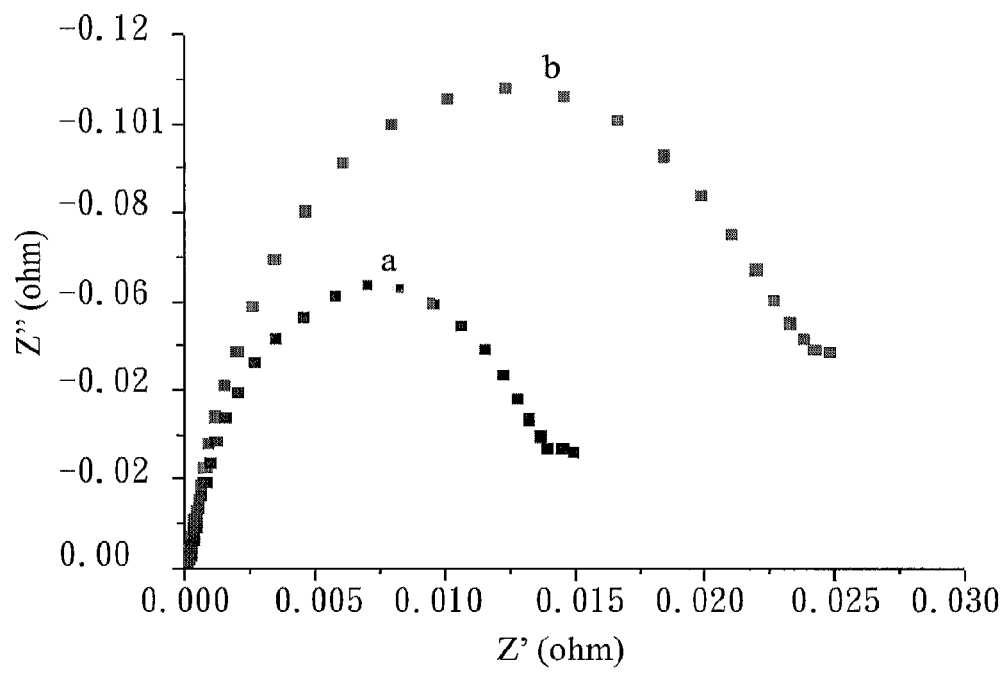
FIG. 8B shows the AC impedance of the two half cells after 480 charge-discharge cycles under a high-temperature of 55° C., wherein Z'/Z" is the real/imaginary part of the AC impedance.

The cathode plates of the example and comparative example were respectively used to assemble button-type half cells, which were subjected to an activation test with 4.3 V charging after being placed still for one day. The alternating-current (AC) impedances of the two half cells are shown in FIG. 8A. Before the charging, the AC impedances of the half cells of the example and the comparative example were almost the same. However, with the proceeding of the charging, the half cell with the cathode material modified by a nitrogen-containing polymer exhibit larger impedances at both the solid-solid interface and the solid-liquid interface. The larger impedances meant that the nitrogen-containing polymer formed a thicker passivation film in the activation process of lithium-ion cell.

Figure 9:
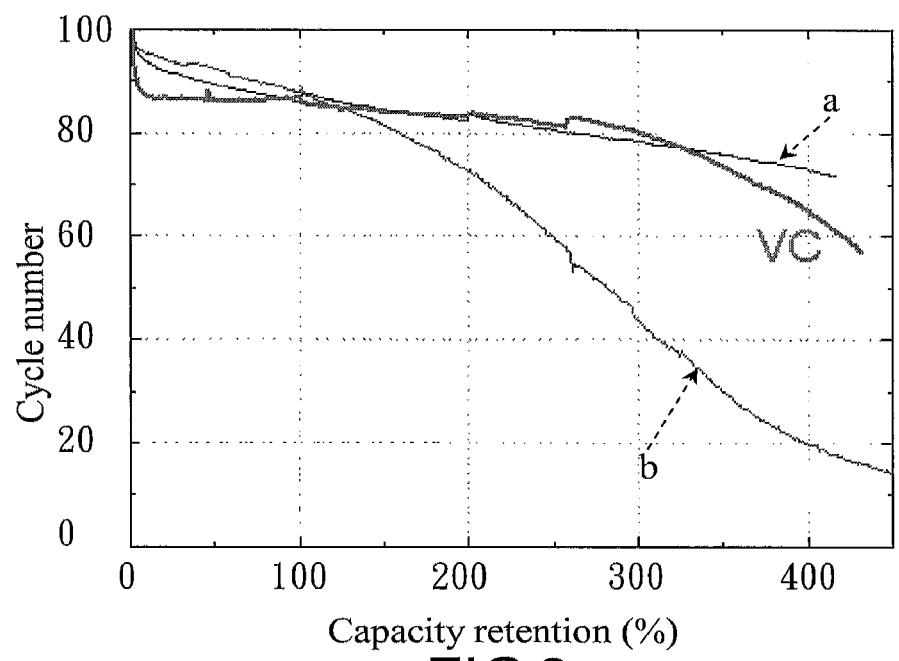
FIG. 9 shows the variations of respective capacity retention ratios of the lithium-ion cell of the example of this disclosure and that of the comparative example with the number of charge-discharge cycles.

Then, the half cells of the example and comparative example were respectively subjected to 480 charge-discharge cycles under a high temperature of 55° C., wherein the respective AC impedances thereof during the charging process were shown in FIG. 8A. Since the AC impedance raise of the half cell using the modified cathode material of the example is much lower than that of the half cell using the non-modified one, the modified cathode material can also increase the cycle lifetime of the lithium-ion cell, as shown in FIG. 9. It is noted that the curve labeled by "VC" in FIG. 9 is the experiment result of the non-modified cathode material in the presence of vinylene carbonate (VC) that is a solvent usually used to prepare an electrolyte of a lithium-ion cell.

<Over-Voltage Test for Simulating Internal Short Circuit of Lithium-Ion Cell>

When an internal short circuit occurs in a lithium-ion cell using the modified cathode material of this invention to cause transient high current and high temperature, multiple safety mechanisms with field-effect actuation are triggered and all the pores in the hyper-branched polymer are shrunk simultaneously and globally to rapidly block the diffusion conduction and the electrochemical reaction of lithium ion between the electrode plates, in combination of the first safety insurance of the separator between the electrode plates. By doing so, the exothermic output at the interface of the electrolyte and the cathode material can be effectively reduced by over 45% and the oxygen release can be inhibited to avoid thermal runaway of the lithium-ion cell.

Figure 10A:
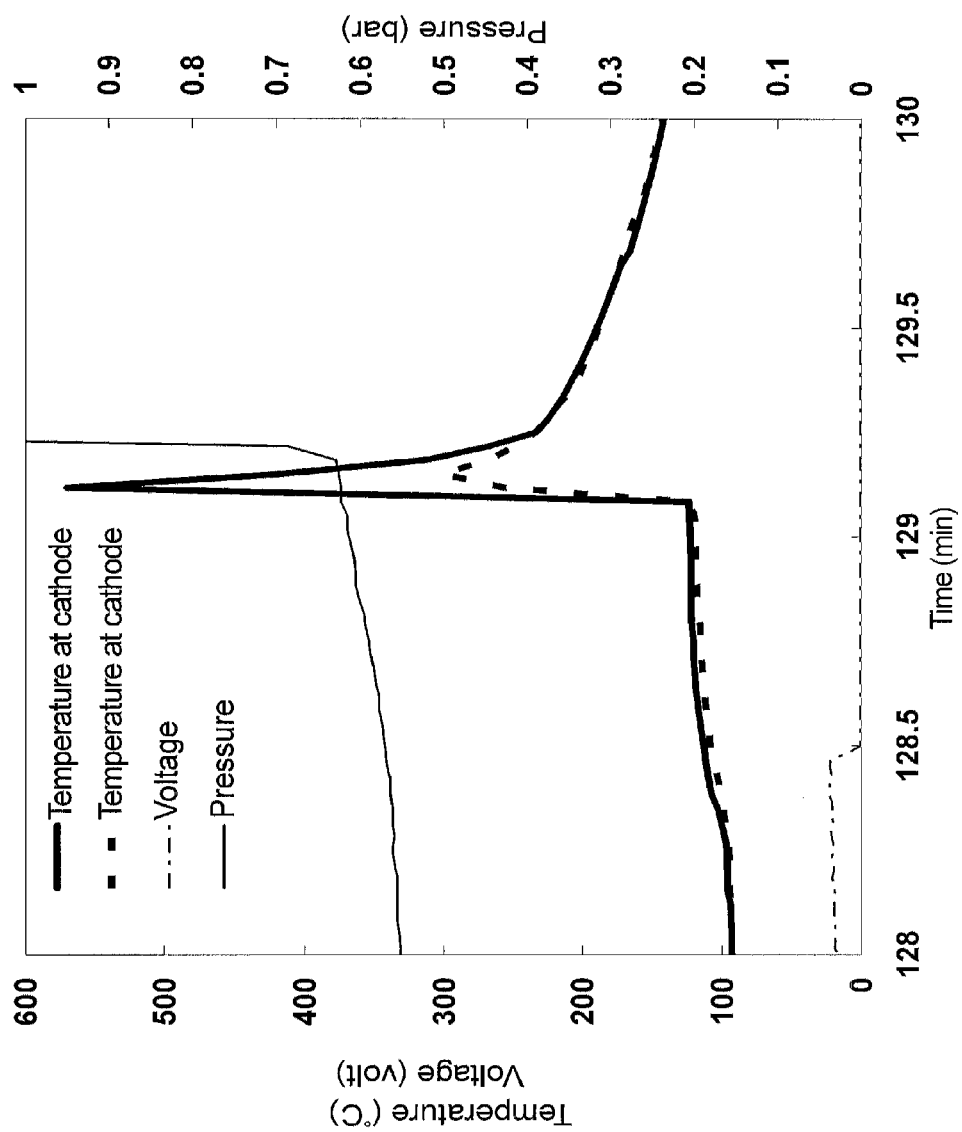
FIG. 10A shows the respective variations of the voltage, the cathode temperature, the anode temperature and the pressure with time, after an internal short circuit occurred in the conventional lithium-ion cell of the comparative example.
Figure 10B:
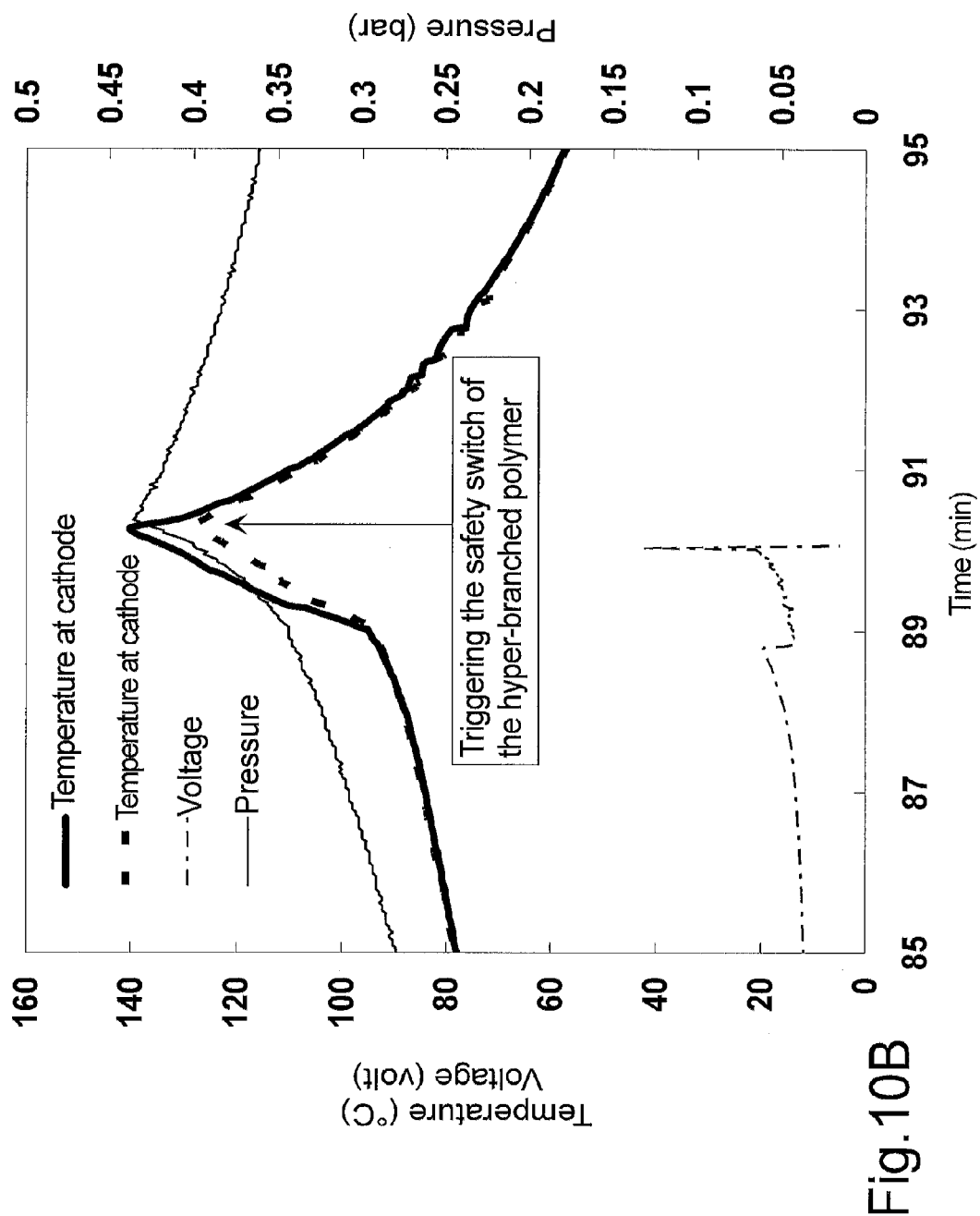
FIG. 10B shows the respective variations of the voltage, the cathode temperature, the anode temperature and the pressure with time, after an internal short circuit occurred in the lithium-ion cell of an example of this disclosure.

In general, after an internal short circuit occurs in a traditional lithium-ion cell, the temperature of the cathode is raised over 550° C. and that of the anode raised over 300° C., and oxygen gas is also generated in a pressure exceeding one atm, as confirmed by the test (over-voltage=20V, current=133 mAh) result of the lithium-ion cell of the comparative example shown in FIG. 10A. The generation of oxygen gas is also a key point that the cell may burn or even explode. However, after an internal short circuit occurs in a lithium-ion cell with a cathode material coated by a hyper-branched polymer of this invention, the highest temperature of the cathode could be controlled at about 140° C. and that of the anode at merely 127° C., and oxygen generation was also inhibited, as indicated by the test (over-voltage=20V, current=133 mAh) result of the lithium-ion cell of the example of this disclosure as shown in FIG. 10B.

Accordingly, the multiple safety mechanisms constituted by the hyper-branched polymer can effectively lower the temperature caused by a short circuit of a lithium-ion cell to about 150° C. that is much lower than the high temperature of 500° C. in the case of the traditional lithium-ion cells, so that the burning or explosion problem in the prior art is solved. Meanwhile, since the reaction at the interface between the electrolyte and the cathode material is greatly reduced to inhibit oxygen release, there is no remarkable cell expansion phenomenon.

Moreover, the lithium-ion cells using modified LNCM+LMO (weight ratio=7:3) and the non-modified analogue respectively are subjected to over-voltage discharge test at 6 C/30V. After the test, the cathode plates were taken out and subjected to a SEM/EDX component analysis. The result is shown in Table 3.

TABLE 3

| Cathode material | Initial ratio of oxygen to Ni/Co/Mn | Ratio of oxygen to Ni/Co/Mn after the test |
|---|---|---|
| Comparative example | Non-modified | 4.0-1.4% | 1.2-1.5% |
| Example | Modified | 4.3-4.8% | 3.8-4.3% |

It is known from Table 3 that the modified cathode material of this invention can effectively inhibit the generation and release of oxygen gas.

<Safety Test of Lithium-Ion Cell>

LCO was used as a base cathode material to fabricate 503759-type lithium-ion cells of the comparative example (non-modified LCO) and the example (modified LCO). After being activated at 4.2V, the lithium-ion cell of the example has an average capacity of 1274 mAh at a discharge rate of 0.2 C, and that of the comparative example has an average capacity of 1340 mAh at the same discharge rate.

The 503759-type lithium-ion cells of the comparative example and the example were also subjected to a nail-penetration test, in which a thermocouple thermometer was embedded in the nail. The result of the penetration test is shown in Table 4.

TABLE 4

| | Number of sample/Result of penetration | Temperature (° C.) at the short circuit site of the cell |
|---|---|---|
| Comparative example | 2/2 failed | >600° C. |
| Example | 5/5 passed | 105-200° C. |

As shown in Table 4, by using a cathode plate with the modified cathode material coated with a hyper-branched polymer of this invention, the safety of the lithium-ion cell can be improved, and the temperature (° C.) at the short circuit site of the cell can also be much lowered as compared to the comparative example.

In addition, lithium-ion cells using modified and non-modified LMO, LCO and LNCM respectively were also subjected to a nail-penetration test, of which the result is shown in Table 5.

TABLE 5

| Cathode material | | LMO | LCO | LNCM |
|---|---|---|---|---|
| Cell energy density (Wh/kg) | | 132 | 195 | 150-180 |
| Cell type | | 18650 | 503759 (soft pack) | 2799130, 7799130 (soft pack) |
| Cell capacity (Ah) | | 1.4, 2.8 | 1.4 | 3, 10 |
| Nail penetration test (Nail φ = 2.5 mm) | Comparative example | Fire, explosion | Fire, explosion | Fire, explosion |
| | Example | Passed | Passed | Passed |

As shown in Table 5, the lithium-ion cells using the modified cathode materials did not catch fire or explode, as compared to the case of the lithium-ion cells using the traditional cathode materials that causes high temperature and burned or even exploded. Accordingly, the composite film coated on the surface of the modified cathode material of this invention has a thermally actuated safety mechanism for the lithium-ion cell.

In the above embodiments and examples of this invention, a hyper-branched polymer film having electrical conductivity is coated on the surface of the cathode material. Thereby, not only the safety switch function and other functions of the hyper-branched polymer can be obtained, but also sufficient electron conductivity can be provided to prevent increase in the resistance of the lithium-ion battery and the energy consumption.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A cathode material structure, comprising:
    a material body, having a particle size of 0.1-50 µm; and
    a composite film, coated on a surface of the material body and having a porous structure and electrical conductivity,
    wherein
    the composite film comprises at least one hyper-branched oligomer/polymer, and at least one nanometer conductive material mixed in the at least one hyper-branched oligomer/polymer, and
    above a safety trigger temperature, a free volume of the at least one hyper-branched oligomer/polymer decreases with an increase in temperature.

2. The cathode material structure of claim 1, wherein the nanometer conductive material is selected from the group consisting of carbonaceous materials, inorganic conductive materials, organic conductive materials, and combinations thereof.

3. The cathode material structure of claim 2, wherein a group of the carbonaceous materials consists of carbon black, graphite, acetylene black, and combinations thereof.

4. The cathode material structure of claim 2, wherein a group the inorganic conductive materials consists of nickel powder, aluminum powder, titanium powder, stainless steel powder, and combinations thereof.

5. The cathode material structure of claim 2, wherein a group of the organic conductive materials consists of organic conductive polymers.

6. The cathode material structure of claim 1, wherein the hyper-branched oligomer/polymer contains nitrogen atoms in a skeleton thereof.

7. The cathode material structure of claim 6, wherein the hyper-branched oligomer/polymer is formed in a process comprising polymerizing a diketone compound and at least one compound that is selected from the group consisting of amine compounds, amide compounds, imide compounds and maleimide compounds.

8. The cathode material structure of claim 7, wherein the diketone compound is selected from the group consisting of barbituric acid, derivatives of barbituric acid, acetylacetone, derivatives of acetylacetone, and combinations thereof.

9. The cathode material structure of claim 1, wherein the material body comprises at least one material selected from the group consisting of Li-M-O series materials and Li—N—X—O series materials, M is selected from the group consisting of Ni, Co, Mn, Mg, Ti, Al, Sn, Cr, V and Mo, N is selected from the group consisting of Fe, Ni, Co, Mn, V and Mo, and X is selected from the group consisting of P and Si.

10. The cathode material structure of claim 1, wherein the composite film also functions as a binder.

11. The cathode material structure of claim 1, wherein a thickness of the composite film ranges from 1 nm to 10 μm.

12. A method for preparing a cathode material structure, comprising:
providing a material body having a particle size of 0.1-50 μm; and
coating, on a surface of the material body, a composite film that has a porous structure and electrical conductivity,
wherein
the composite film comprises at least one hyper-branched oligomer/polymer, and at least one nanometer conductive material mixed in the at least one hyper-branched oligomer/polymer, and
above a safety trigger temperature, a free volume of the at least one hyper-branched oligomer/polymer decreases with an increase in temperature.

13. The method of claim 12, wherein coating the composite film on the surface of the material body comprises: immersing the material body in a solution that contains the hyper-branched oligomer/polymer and the nanometer conductive material.

14. The method of claim 12, wherein coating the composite film on the surface of the material body comprises:
immersing the material body in a solution that contains the nanometer conductive material and a precursor of the hyper-branched oligomer/polymer; and
reacting the precursor to form the hyper-branched oligomer/polymer and in-situ coat the surface of the material body with the hyper-branched oligomer/polymer together with the nanometer conductive material.

15. The method of claim 12, wherein coating the composite film on the surface of the material body comprises:
immersing the material body in a solution that contains the nanometer conductive material and monomers for forming the hyper-branched oligomer/polymer; and
polymerizing the monomers to form the hyper-branched oligomer/polymer and in-situ coat the surface of the material body with the hyper-branched oligomer/polymer together with the nanometer conductive material.

16. The method of claim 12, wherein the nanometer conductive material is selected from the group consisting of carbonaceous materials, inorganic conductive materials, organic conductive materials, and combinations thereof.

17. A cathode material structure, comprising:
a material body, having a particle size of 0.1-50 μm; and
a composite film, coated on a surface of the material body and having a porous structure and electrical conductivity,
wherein
the composite film comprises at least one hyper-branched oligomer/polymer, and at least one nanometer conductive material mixed in the at least one hyper-branched oligomer/polymer,
above a safety trigger temperature, a free volume of the at least one hyper-branched oligomer/polymer decreases with an increase in temperature, and
the composite film is coated on the surface of the material body by steps comprising:
immersing the material body in a solution that contains the nanometer conductive material and monomers for forming the hyper-branched oligomer/polymer, while the material body is not mixed with a binder; and
polymerizing the monomers to form the hyper-branched oligomer/polymer and in-situ coat the surface of the material body with the hyper-branched oligomer/polymer together with the nanometer conductive material.

18. A method for preparing a cathode material structure, comprising:
providing a material body having a particle size of 0.1-50 μm; and
coating, on a surface of the material body, a composite film that has a porous structure and electrical conductivity,
wherein
the composite film comprises at least one hyper-branched oligomer/polymer, and at least one nanometer conductive material mixed in the at least one hyper-branched oligomer/polymer,
above a safety trigger temperature, a free volume of the at least one hyper-branched oligomer/polymer decreases with an increase in temperature, and
coating the composite film on the surface of the material body comprises:
immersing the material body in a solution that contains the nanometer conductive material and monomers for forming the hyper-branched oligomer/polymer, while the material body is not mixed with a binder; and
polymerizing the monomers to form the hyper-branched oligomer/polymer and in-situ coat the surface of the material body with the hyper-branched oligomer/polymer together with the nanometer conductive material.

* * * * *